US011261054B2

(12) United States Patent
King et al.

(10) Patent No.: US 11,261,054 B2
(45) Date of Patent: Mar. 1, 2022

(54) METHOD OF GENERATING BUTTONS FOR CAR OPERATING PANELS

(71) Applicant: TK Elevator Innovation and Operations GmbH, Duesseldorf (DE)

(72) Inventors: Chih-Hung Aaron King, Sharpsburg, GA (US); Sean Luis Stecker, Kennesaw, GA (US); Finley Williamson, Atlanta, GA (US)

(73) Assignee: TK Elevator Innovation and Operations GmbH, Duesseldorf (DE)

( * ) Notice: Subject to any disclaimer, the term of this patent is extended or adjusted under 35 U.S.C. 154(b) by 0 days.

(21) Appl. No.: 16/878,162

(22) Filed: May 19, 2020

(65) Prior Publication Data
US 2021/0362977 A1 Nov. 25, 2021

(51) Int. Cl.
| | | |
|---|---|---|
| *G06F 3/0482* | (2013.01) | |
| *G06F 3/0484* | (2013.01) | |
| *G06F 3/0488* | (2013.01) | |
| *B66B 1/46* | (2006.01) | |
| *B66B 1/52* | (2006.01) | |
| *G06F 3/04847* | (2022.01) | |
| *G06F 3/04886* | (2022.01) | |

(52) U.S. Cl.
CPC ............ *B66B 1/463* (2013.01); *B66B 1/52* (2013.01); *G06F 3/0482* (2013.01); *G06F 3/04847* (2013.01); *G06F 3/04886* (2013.01); *B66B 2201/4623* (2013.01)

(58) Field of Classification Search
CPC ... B66B 1/52; B66B 1/463; B66B 2201/4623; G06F 3/0482; G06F 3/04847; G06F 3/04886
See application file for complete search history.

(56) References Cited

U.S. PATENT DOCUMENTS

| | | | | |
|---|---|---|---|---|
| 5,679,934 A | * | 10/1997 | Juntunen | ................. B66B 1/462 187/384 |
| 2007/0250199 A1 | * | 10/2007 | Akasaka | .............. G06Q 10/087 700/97 |
| 2017/0174473 A1 | * | 6/2017 | Simcik | ................ G06F 3/04842 |
| 2017/0277407 A1 | * | 9/2017 | Siravuri | ............... G06Q 20/123 |
| 2018/0307655 A1 | * | 10/2018 | Muncy | .................... B66B 1/463 |
| 2019/0177116 A1 | | 6/2019 | Muncy et al. | |

FOREIGN PATENT DOCUMENTS

| | | |
|---|---|---|
| JP | 2019026417 A | 2/2019 |
| WO | 2013/012409 A1 | 1/2013 |

OTHER PUBLICATIONS

UDS, ADA Focus: Elevators, Jun. 3, 2012, pp. 1-22. (Year: 2012).*
International Search Report, dated Aug. 5, 2021, in counterpart International Application No. PCT/EP2021/063099.
MAD Elevator Fixtures; Elevator Touchscreen Systems 2016 Product Catalog; 2016; pp. 1-44; Box 61070, Kensington RPO, Calgary, Alberta, Canada T2N 4S6.

* cited by examiner

*Primary Examiner* — Tan H Tran
(74) *Attorney, Agent, or Firm* — William J. Cassin (57) ABSTRACT

A computer-implemented method of automatically generating and populating one or more car floor buttons on a configuration tool display wherein the configuration tool is in communication with an elevator cabin of an elevator system.

12 Claims, 8 Drawing Sheets

METHOD OF GENERATING BUTTONS FOR CAR OPERATING PANELS

FIELD

The present disclosure relates to methods and devices configured to generate buttons in car operating panels, such as those used in elevator cars.

BACKGROUND

In-car elevator display systems for call input are becoming more desirable as the prevalence of touch screen interfaces increases. The configuration, design and function of these in-car elevator display systems, also known as car-operating panel (COP) displays, requires a significant time investment to lay out the buttons according to the configuration of both the job and of each elevator. The in-car display must be configured to display the specific number of buttons with the correct floor label as well as the respective car floor. In addition, there may be elevator codes and regulations that dictate the size, spacing, and ordering of buttons.

Currently, these tasks are performed manually through a dedicated configuration tool by contract engineering in the factory. This is an added process and thus too an added cost. In addition, this configuration tool is a separate system and may not be connected to the in-car display—i.e. it requires a technician to manually change the configuration, download the updated configuration file, go to the building, place each car into service mode, then update the displays on each car.

Current touchscreen COP themes require a technician or designer to manually add, resize, and position all buttons for the floors an elevator serves. To achieve a layout with buttons both evenly spaced and of equal size takes an incredible amount of work and calculation. Additionally, even simple changes to the size or positioning of the COP's layout requires all these steps to be repeated in their entirety, the time required for which increases significantly as the number of floors an elevator serves increases. Since extensive customization is needed for each elevator, and with the variability in both content layout and in potential number of floors served, configuration of the buttons on a touchscreen COP is arduous and inexact.

For some building layouts there may be skipped floors or alphanumeric labels used for the floor label that are not indicative of the numeric car floor number the elevator control system uses to navigate between the floors. This means with the current system some sort of manually-created text file needs to be generated for each COP with a mapping between the source image file for a button, the positioning of that button, and the car floor associated with the button to be sent to the control system. If a mistake is made on the theme or a change is requested to a label or the button layout, then this manually-created text file needs to be updated on every COP for every button that changed in addition to all the other manual changes listed above.

It is thus an object of the invention to provide an easier and quicker way of creating aesthetically pleasing, well-configured button layouts. This object is solved by methods and devices according to the present disclosure.

SUMMARY

The invention relates to a configuration tool that enables a computer-implemented method of automatically generating and populating one or more car floor buttons. The configuration tool operates such that one or more car floor buttons are displayed on a configuration tool display wherein the configuration tool is in communication with an elevator cabin of an elevator system. The method includes extracting information from one or more information source associated with and corresponding to the elevator system using the configuration tool with executable code resident within a computer structure. The extracted information may include, e.g., elevator information, GUI elements, and layout information.

The computer structure may be a computing device such as a desktop computer, a laptop computer, a smart phone, a tablet, an embedded display device, a web or other server. The computer structure may be either a dedicated or ancillary computing device adapted to generate and configure content for a display. The computer structure may include a processor which may be in data communication with a network interface, an input device, an output device, and computer memory.

The processor may be one or more digital processors. The network interface may be implemented as one or both of a wired network interface and a wireless network interface as is known in the art. The input device may include a keyboard, a mouse, a stylus pen, buttons, knobs, switches, touch or visual gesture recognition, and/or any other device that may allow a user to provide an input to the configuration tool via the computer structure.

In some embodiments, the input device may include an embedded media memory, e.g., a laptop memory, a smart phone memory, any kind of wired or wireless-based communication device e.g., a network connection, smartphone, tablet, mobile device, wearable device, or an external port, such as a USB port or a SD or microSD port to allow media information to be communicatively coupled to the computer structure.

The output device may include one or more visual indicators e.g., a display, audible indicators, e.g., speakers, tactile or haptic indicators, e.g., vibration, or a combination of multiple types of indicators, or any other such output device currently known or subsequently developed. In some embodiments, at least a part of the input device and the output device may be combined.

Memory may be one or more of volatile memory, e.g. RAM and non-volatile memory, e.g. ROM, FLASH, magnetic media, optical media. Memory may be at least in part implemented as network storage that is external to the computer structure and accessed via the network interface. The memory may house software, which may be stored in a transitory or non-transitory portion of the memory.

Software includes machine readable instructions, i.e., algorithms that are executed by the processor to perform the functionality described herein. In some example embodiments, the processor may be configured through particularly configured hardware such as an application specific integrated circuit (ASIC), field-programmable gate array (FPGA) and/or through execution of software to perform functions in accordance with the disclosure herein. The algorithms are instructions capable of extracting information from the information sources in the elevator system, e.g., information relating to size, spacing, and orientation of the touchscreen buttons, and generate a useable display.

The method, in one aspect, is directed to a computer-implemented method for generating and configuring content of a car operating panel of an elevator system, said car operating panel including a touchscreen interface, the method including initiating a configuration mode of the car operating panel. Elevator configuration information is entered into the car operating panel, said elevator configuration including a lobby floor, a number of car floors, a floor label for each car floor, and an opening direction. The method includes generating, with a non-transitory computer readable medium with computer executable instructions stored thereon executed by a digital processor, a car floor button screen, based on a selected group of parameters, the parameters including button size, button spacing, text size of button text, order and placement of buttons, and margins of the car operating panel. The generating step includes calculating size of the buttons based on a height and width of dimensions of the car operating panel, wherein the calculating further includes calculating a number of rows and columns sized such that the calculated size of the buttons fit within the calculated number of rows and columns. A button layout is generated combining the calculated number of rows and columns and the calculated size of the buttons, setting label size for the buttons based on said calculating size of the buttons and calculated number of rows and columns. A car operating panel display is then generated including the car floor button screen in the calculated number of rows and columns. The generated car operating panel display is output to the touchscreen interface.

The method, in one aspect, includes using the extracted information to generate a usable car floor button screen and communicating a usable car floor button screen from the configuration tool to the configuration tool display and presenting it to a user. A user can be a technician or an elevator user.

The method, in another aspect provides functionality that may be referred to herein as an Automated Destination Screen and Button Generator (ADSAG), which takes, for example, elevator information, page/button graphic design information, and internal button layout parameters and generates a useable car floor button screen.

In another aspect of the invention, the method further includes the steps of using the extracted information to calculate a height and/or width of one or more floor button using the height of a car operating panel (COP) display area as a baseline, using the calculated height of the one or more floor button to calculate height and or width of the floor button to calculate appropriate floor label text size, using the calculated height of the one or more floor button to calculate a number of rows and columns that could be used for fitting a plurality of floor buttons associated with a plurality of destination floors, optionally generating an updated floor button layout based on one or more calculated height, or the calculated number of rows and columns, and wirelessly communicating the updated floor button layout to the COP display and presenting it to a user.

The configuration tool display may be accessible via the COP display or the configuration tool display is a separate display i.e., inaccessible from the COP display, e.g., a web-interface, or a computer program.

In one aspect of the disclosure one or more of the width of one or more floor button, the horizontal and vertical space between one or more button, or the horizontal and vertical outer margins around the edge of the display is optionally calculated in addition to or alternatively to using the extracted information to calculate the height and/or width of the buttons. The minimum dimensions of the one or more button presented to the user on any one of the configuration tool display or the COP display preferably using the computer structure of the configuration tool, is determined according to or taking into consideration an elevator code standard.

The method may be iterative. This is particularly useful if for example, a calculated button size fails to meet the dimensions given in the code of requirements. When this happens, the method can be applied any number of additional times so that the automatically generated one or more car floor buttons for display on a configuration tool display, or for example, a COP display, are compliant with standardized requirements and with any optional requirements such as: sequence, size, spacing, rotation, position and orientation of buttons or button labels. Therefore, the sequence of a button layout can be automatically configured using the customization tool to be compliant to various elevator code requirements.

The information sources may include elevator information, wherein the information is preferably specific to the elevator that the configuration tool serves, graphical user interface (GUI) elements, which preferably includes graphical design guidelines on how the destination page and buttons will look, layout information, and/or wherein the information preferably includes any optional parameters that may be related to regional elevator codes, in particular, the aesthetics of a configuration tool display.

The elevator information may include information relating to one or more specified lobby floor, a preferred number of floors to be serviced by car, general floor information, e.g., particular floor labels, and/or front/rear car door openings and the like.

The GUI elements may include button container information, wherein said container comprises the car call buttons. Button container information may include information relating to size, width, height and position (x, y). Information that may be used to calculate the placement size, and layout of the buttons configured within the ADSAG includes a button graphic design template, preferably including button graphics, image or color-based button graphics e.g., the label text color, for when the button in at least one of the following operational states: a normal state, a pressed state, a locked state, or a disabled state.

The layout information may include: a preferred button size, a preferred minimum button size, wherein this is preferably determined by the elevator code standard; a preferred minimum spacing between buttons wherein this is preferably determined by the elevator code standard; a preferred ordering and/or placement of buttons, e.g., buttons need to increment from left to right, and from bottom to top; a preferred floor label text size; a preferred variable button design with preferred variable size requirements, e.g., larger, longer, taller, smaller, or any other preferred physical alteration; preferred elevator code requirements including for example: sequence, size, spacing, rotation, position and orientation of buttons or button labels. This provides an ADSAG that can self-determine the button size and position dynamically so these parameters can become variable size requirements.

The information source may be provided to the device including at least one software algorithm disposed within a computer structure via an input device. In yet another aspect of the disclosure the method may further include communicating an updated floor button layout to any one of the configuration tool display or the COP display and presenting it to a user via a user-interface.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 is a more detailed representation of aspects of the configuration method of FIG. 1a.

DETAILED DESCRIPTION

Figure 1:
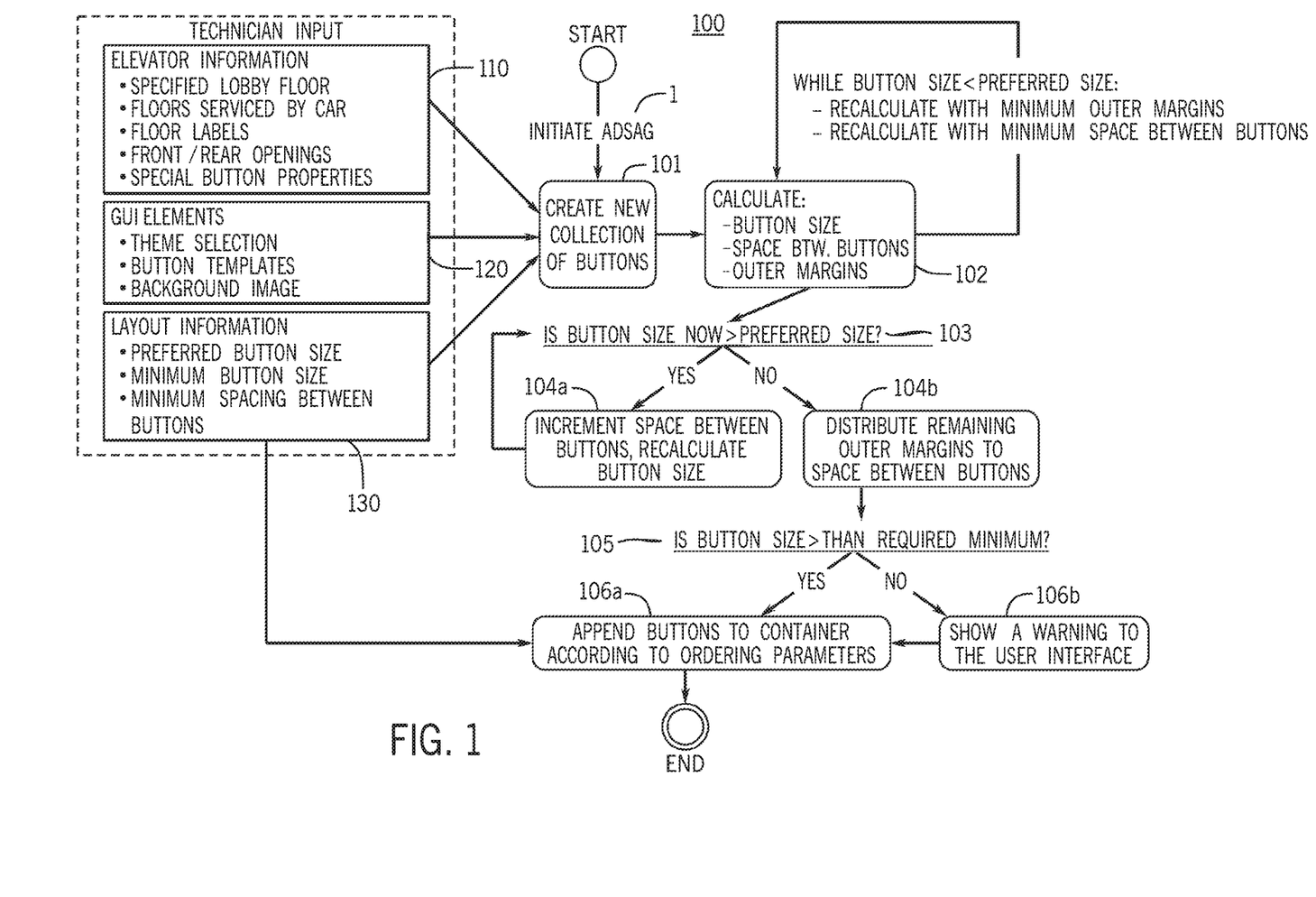
FIG. 1 is a schematic representation of a configuration tool display configuration method according to the disclosure.
Figure 2:
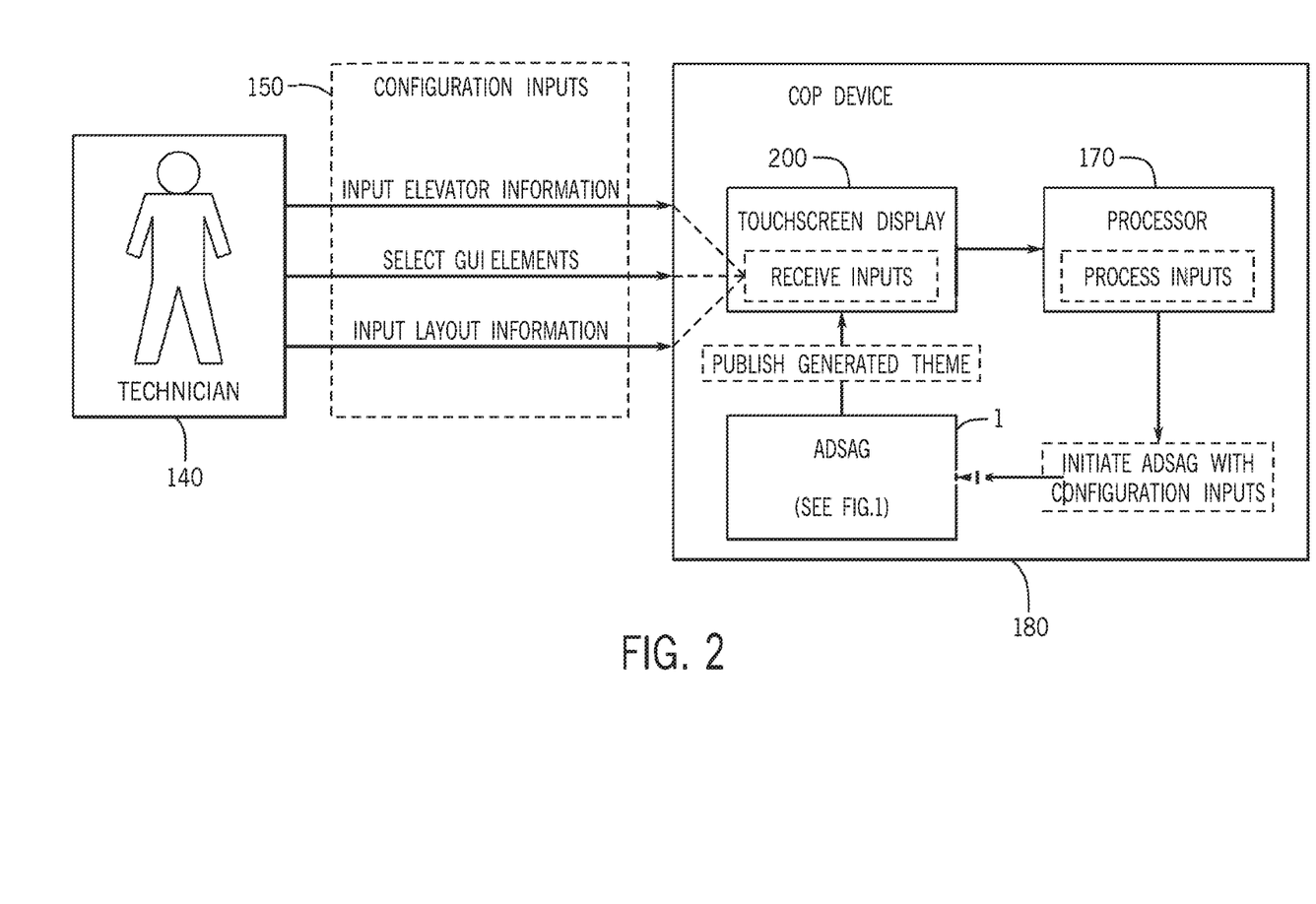

FIGS. 1 and 2 outline embodiments of a computer implemented method 100 according to the invention. The method utilizes information which may be extracted from information sources comprised within an elevator system or alternatively or in combination with a touchscreen interface, or through importing a configuration file/data through external sources, including an elevator controller, or via file transfer via USB-type media storage, or the like. The information is used to automatically generate and populate car floor buttons and associated display elements.

According to an embodiment of the invention the method may include initiating by a technician 140, in a touchscreen interface 200 of the car-operating panel 160, a configuration input mode 150. While in the configuration mode, information is input 101, with the information including one or more of elevator information 110, GUI elements 120, and layout information 130.

The technician 140 may optionally select, via the touchscreen interface 200, a theme template from a list of pre-defined theme templates, or may create a customized theme template by choosing from predefined graphical objects, including but not limited to button designs, background images, text colors, card sizes, transparency, fonts, and so on. Also, the technician may at this point assign custom car floor buttons and their properties.

The information from 101 including the configuration inputs 150 is communicated to the button generator 180 including the ADSAG 1 which through operation of processor 170 generates a useable car floor button screen for display 200. The ADSAG 1 performs all calculations following the layout parameters in 102.

The layout parameters may be set according to applicable code requirements. The layout parameters include preference/minimum button size, preference/minimum floor text size, preference/minimum spacing between buttons, order/placement of floor buttons. In one example, the buttons may increment from left to right, and from bottom to top. The layout parameters also include margins of the display 200 including the horizontal and vertical outer margins of the display.

In addition, local or other code requirements may specify the sequence, size, spacing, rotation, position, or orientation of buttons or button labels. Where specified via such regulations, the code requirements may be provided as an initial default set of specifications for the layout parameters.

Given the height and width of the containing space and number of rows and columns, step 102 calculates the button height & width, the horizontal and vertical space between buttons, and the horizontal and vertical outer margins around the edge of the container.

Depending on the result of the calculation, step 103 determines whether the calculated button size is greater than the preferred size. If the button size is greater than the preferred size, then the ADSAG 1 continues to step 104a. This involves incrementing the space between the buttons and recalculating the button size. If the calculated button size is smaller than the preferred button minimum (e.g., initially, 1 inch/2.54 cm), the ADSAG 1 implements step 104b to distribute the remaining outer margins to the space between the buttons 20. This step involves calculating the button size again with the outer margins set to their preset minimum. This is performed according to step 105 wherein the ADSAG 1 controls whether the button size is still smaller than preferred minimum. In this case, the button size can be calculated with the horizontal and vertical space between buttons set to their preset minimum.

After this step, the buttons may be very close to each other. If the buttons size is now greater than the preferred minimum, step 106a will iteratively increment the button buffer and recalculate button size until the preferred minimum is met. This step is important to maintain preferred button size while also maximizing the space between buttons. The remaining outer margins are then equally distributed to the horizontal/vertical space between the buttons. This ensures the end layout of the configuration tool display will have an equal distribution. A finishing validating step is performed to ensure that the button size is larger than code-required minimum button size (e.g., ¾ inch/1.9 cm). If the buttons do not meet code standard, e.g., if the buttons' size is smaller than the required minimum, step 106b initiates a warning flag to be displayed on the user interface of the configuration tool.

As a finishing step, the configured buttons are presented on a user interface 200 of the configuration tool 1001. The label size is set proportionate to the calculated button size and the ADSAG 1 may be idled or shut down with any warning flags being displayed. If no warning flags are generated, the configuration tool 1001 will automatically publish the configuration to a user interface. If a warning flag is generated, the user 140 may be prompted to decide whether or not the configuration is acceptable before publishing the configuration to a user interface 200. In an embodiment of the invention, the user interface of the configuration tool 1001 is accessible via the COP display 200. In an embodiment of the invention, the user interface of the configuration tool 1001 is accessible via a separate display (not shown).

The inventive method advantageously allows for automatic configuration of a usable touchscreen button layout. The process is quick, precise, endlessly repeatable, and designed to require minimal input from the end user. If a change in the number of served floors or label of a specific floor is requested, then the configuration need only be re-accessed, modified in the desired way and the algorithm will repeat itself to generate the new layout without requiring any of the manual button manipulation or mapping. The configuration tool 1001 that is able to create its own button layouts allows for rapid layout configuration to be presented on a user interface in minutes, rather than hours or even days. This process can save countless work hours for technicians, designers, and building owners. The inventive method provides a seamless "Plug-n-Play" experience in field installation process, reduces contract engineering cost in the factory, reduces field labor cost for touchscreen COP installation, and reduces field labor cost if buttons need to be modified due to changes in elevator configuration.

Figure 3:
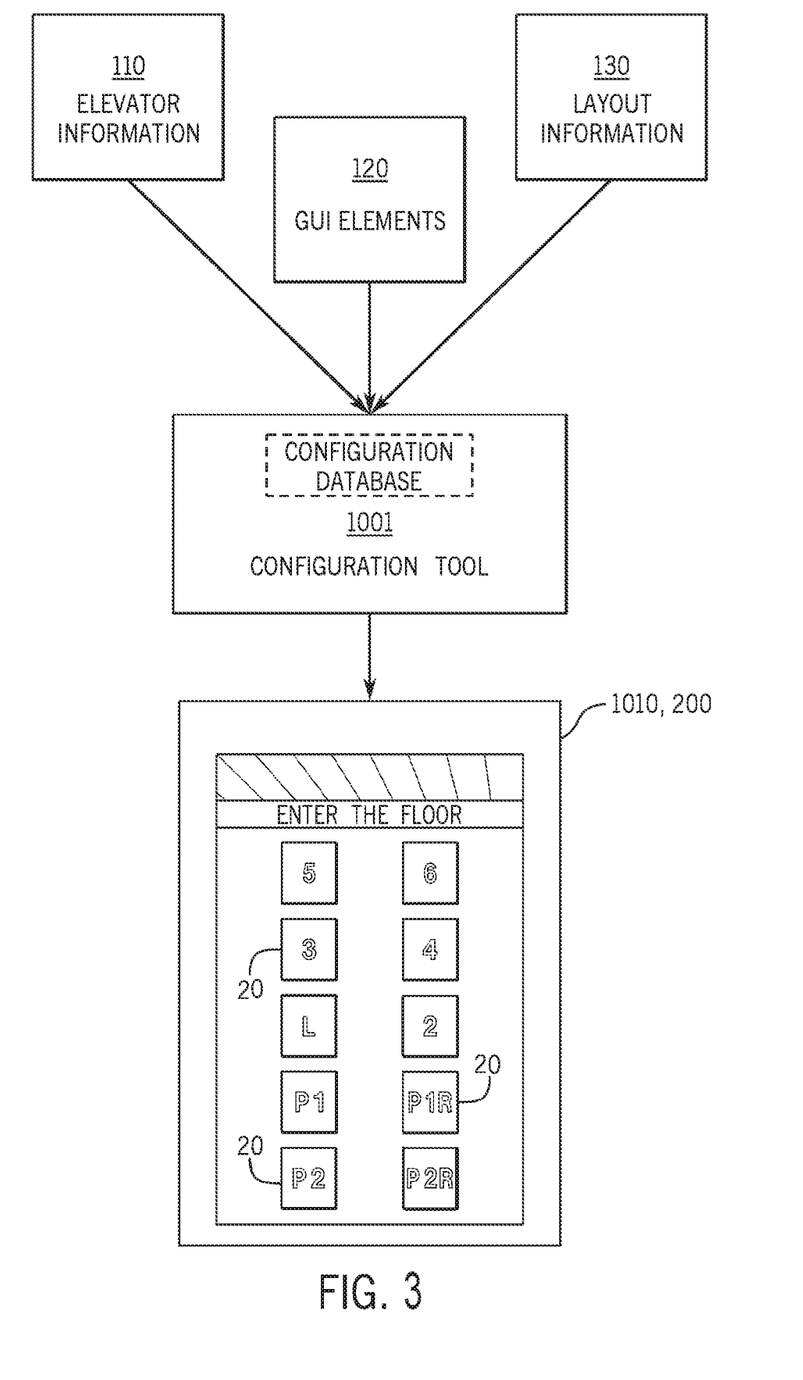
FIG. 3 is a schematic representation of inputs and outputs to a configuration tool according to the disclosure.

FIG. 3 is a representation of a part of the inventive method wherein information is extracted from or provided by three information sources: elevator information 110, GUI elements 120, layout information 130, and provided to the automated destination screen and button generator (AD-SAG) 1 of the configuration tool 1001 where the extracted information is processed according to the method described in FIG. 1 to automatically provide car floor buttons 20 in a customized layout on a configuration tool display 1010, wherein in this particular example, the configuration tool display 1010 is accessible via a touchscreen COP display 200.

FIGS. 4a-4e are examples of a user interface of a configuration tool display 1010 of the configuration tool 1001. In FIG. 3a, the user interface of a configuration tool display 1010 is a COP display 200 which shows the layout of the technician settings whilst FIG. 3b shows the option page presented to a technician when inputting information in order to perform the ADSAG method 100.

Figure 4A:
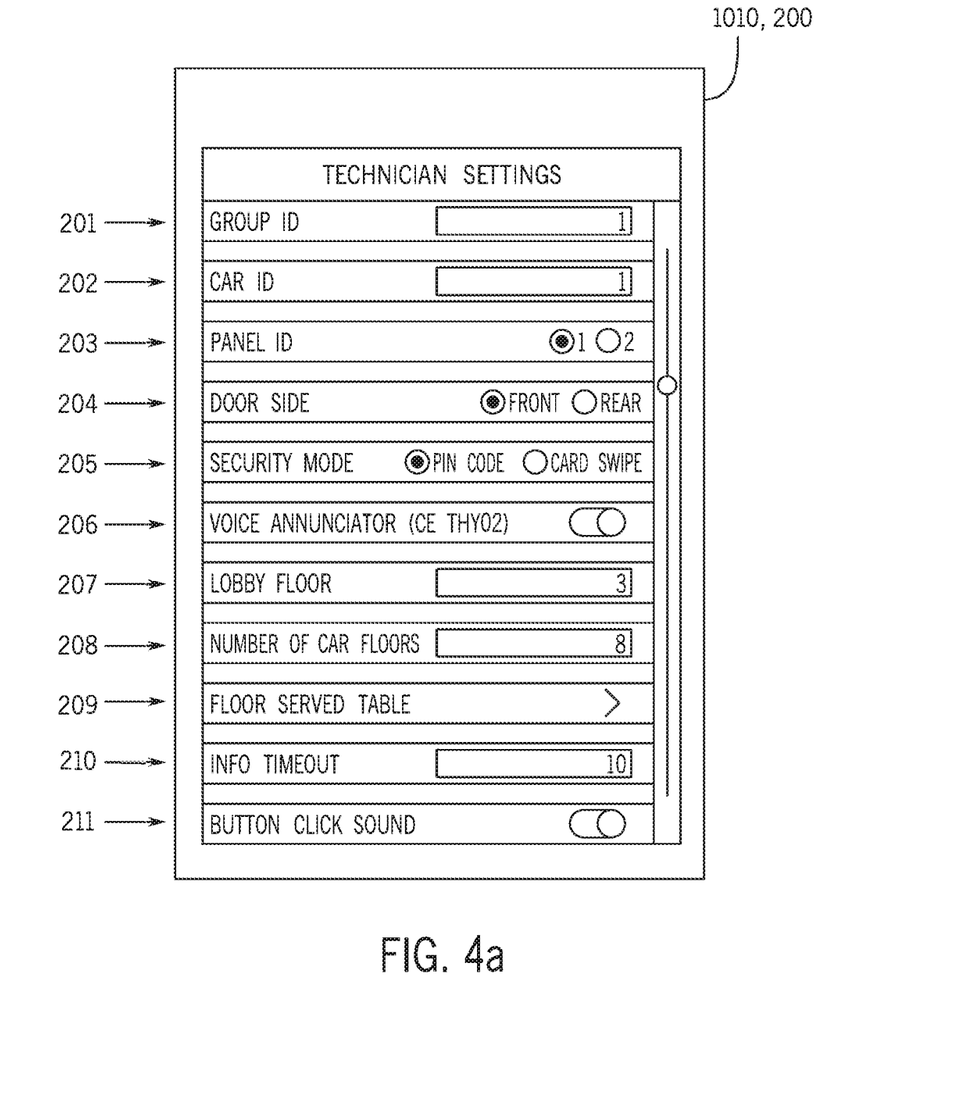
FIGS. 4a-e are schematic representations of a configuration display of the configuration tool according to the disclosure.

In FIG. 4a, the technician can identify the elevator containing the COP display 200 that needs to be generated using ADSAG method 100 by inputting the elevator's group ID information 201 and specify the position of the COP display within the car by inputting the particular left or right designation 203 and the particular front or back designation 204. The technician can select the lobby floor for a car 207 and how many floors an elevator will serve 208 whilst setting the method of accessing locked floors on the COP display 205. The technician can specify the particular requirements for each floor separately 209, with further specifications including voice control 206, time outs 210 and button sounds 211 being possible.

Figure 4B:
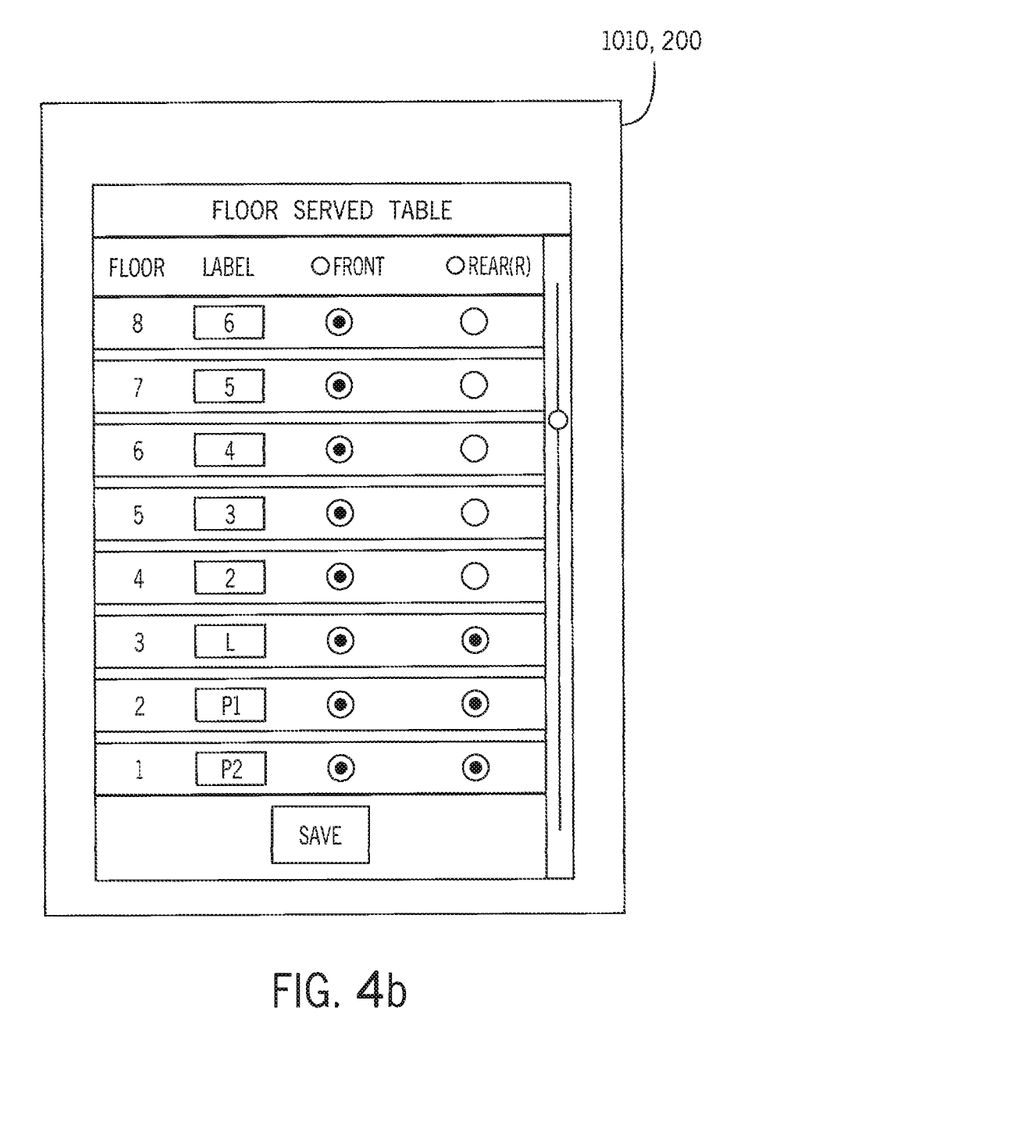

FIG. 4b shows the floor served table after having selected option 209 in FIG. 4a. This table shows the number of floors that are served by the elevator (first column), and their corresponding labels (second column). The labels can be inputted by the technician. The third and fourth columns allow the technician to select from the front and rear doors of the elevator. Where necessary, both the front and the rear door openings can be selected, e.g., floors 1 and 2. After having made the necessary selections, the technician clicks the "save" button and the method 100 according to the invention can begin.

Figure 4C:
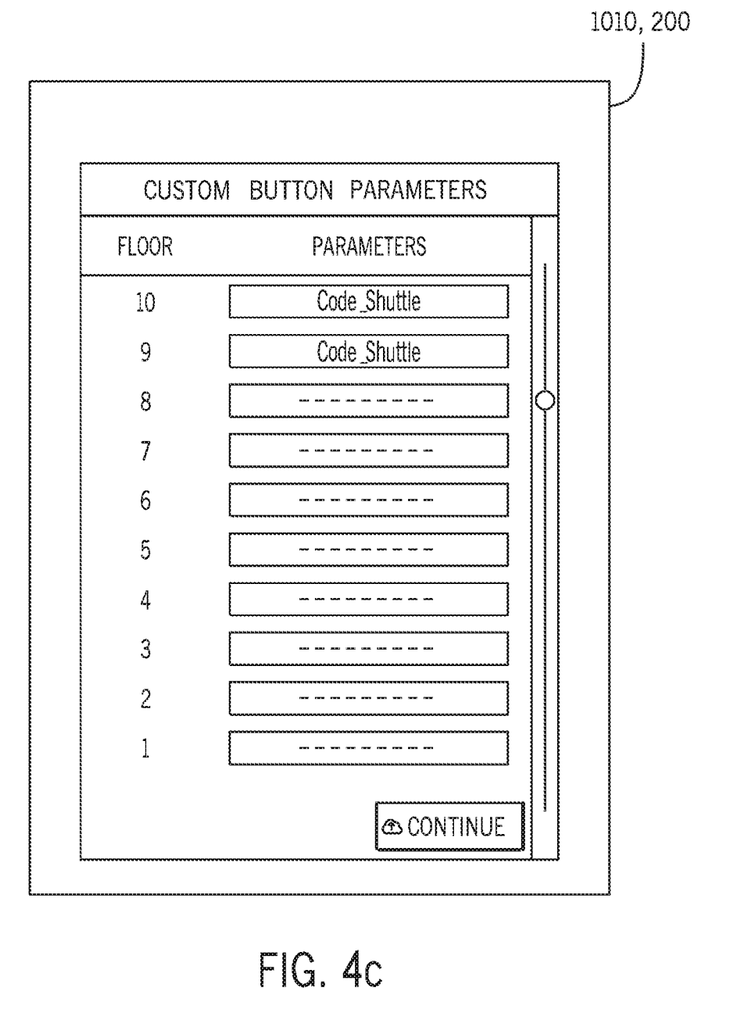

In FIG. 4c, the user interface of the configuration tool display 1010, in this example, a COP display 200, shows a means for adding a floor call parameter to an elevator floor, thereby allowing special button parameters to be passed into the ADSAG 1. An example of a special button parameter is "shuttle"; when an elevator button with the "shuttle" parameter is pressed, the elevator car will travel straight to the floor selected without making any intermediate stops.

Figure 4D:
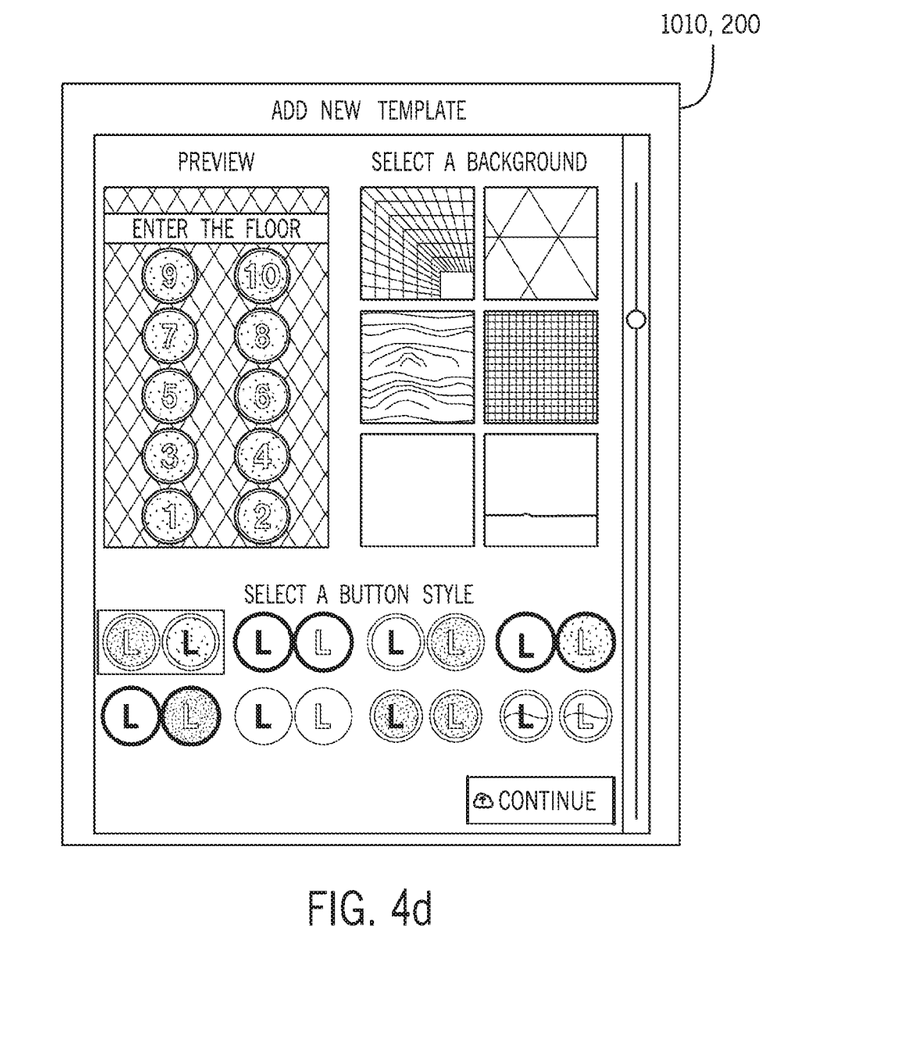
Figure 4E:
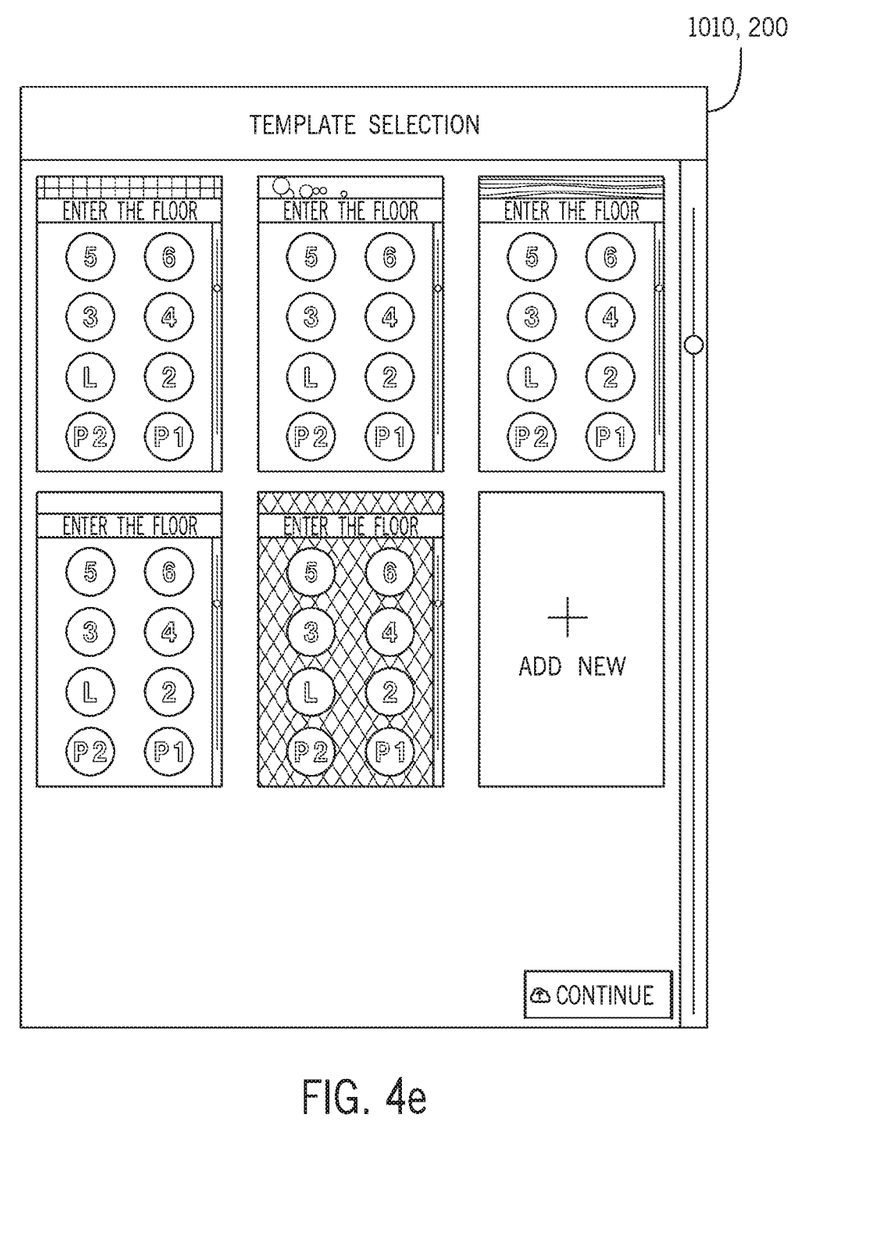

In FIGS. 4d-4e, the user interface of the configuration tool display 1010 in this example, a COP display 200, shows a means for selecting graphical-related information for the floor button graphics and GUI pages (including config files and images) that can be passed into the ADSAG 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for generating and configuring content of a car operating panel of an elevator system, said car operating panel including a touchscreen interface, the method comprising:

initiating a configuration mode in a configuration tool for the car operating panel, which configuration mode permits the generation and configuration of content to be displayed on the car operating panel;

inputting into the configuration tool elevator configuration information including specification of a lobby floor, a number of car floors, and a floor label for each car floor;

generating in the configuration tool, with a non-transitory computer readable medium with computer executable instructions stored thereon executed by a digital processor, a car floor button screen containing a plurality of simultaneously displayed buttons, based on a selected group of parameters, including at least preferred button size, minimum button size, preferred button spacing, minimum button spacing, order of buttons, and height and width dimensions of the car floor button screen that is to be displayed on the car operating panel, and margins of the car floor button screen, said generating of the car floor button screen comprising:

determining, based on a number of buttons to be simultaneously displayed, a number of rows and columns in which to arrange the plurality of buttons, calculating size of the buttons based on the height and width dimensions of the car floor button screen, a default margin around the edge of the car floor button screen, the determined number of rows and columns in which the buttons are to be arranged in the car floor button screen, and the preferred button spacing between adjacent buttons, reducing the outer margin from the default margin size to the minimum margin size, reducing the button spacing from the preferred button spacing to the minimum button spacing, and recalculating the size of the buttons, in response to a determination that the calculated button size is less than the preferred button size, in an iterative manner incrementally increasing the button spacing and subsequently recalculating the button size after each such incremental increase, in response to a re-determination that the recalculated size of the buttons is larger than the preferred button size, until a re-determination shows the subsequent recalculated size of the buttons is substantially equal to the preferred button size, generating a button layout in which the plurality of buttons are arranged into the determined number of rows and columns and sized to the subsequent recalculated button size;

generating in the configuration tool a car operating panel display including the car floor button screen, containing the buttons arranged in the determined number of rows and columns; and outputting the generated car operating panel display to the car operating panel touchscreen interface.

2. The method of claim 1, further comprising:
entering the elevator configuration information into the configuration tool via one or more of the touchscreen interface of the car operating panel or a source external to the car operating panel.

3. The method of claim 1, further comprising:
selecting, via the configuration tool, a theme template from a list of predefined theme templates.

4. The method of claim 3, further comprising:
creating, via the configuration tool, a customized theme template by selecting graphical objects from a list of predefined graphical objects.

5. The method of claim 4 wherein the list of predefined graphical objects includes button designs, background images, text colors, card sizes, transparency, or fonts.

6. The method of claim 1, further comprising:
assigning one or more button properties to one or more of the buttons.

7. The method of claim 1, wherein said generating of the car floor button screen further comprises calculating a size of text to be displayed on each button, based on the calculated button size.

8. The method of claim 1 wherein the parameters specify the margins in which graphical elements of the car operating panel are positioned.

9. The method of claim 1 wherein the configuration tool is accessed via the car operating panel touchscreen.

10. The method of claim 1, wherein the configuration tool display is a separate display from the car operating panel display.

11. The method of claim 10 wherein a minimum button size on one or both of the configuration tool display or the car operating panel display is specified according to an elevator code standard.

12. A non-transitory computer readable medium with computer executable instructions stored thereon executed by a digital processor to perform the method of generating and configuring content of an elevator car operating panel, comprising:

instructions for initiating a configuration mode of the car operating panel;

instructions for enabling the entering of elevator configuration information into a configuration tool for the car operating panel, said elevator configuration information including specification of a lobby floor, a number of car floors, and a floor label for each car floor;

instructions for generating in the configuration tool, with a non-transitory computer readable medium with computer executable instructions stored thereon executed by a digital processor, a car floor button screen containing a plurality of simultaneously displayed buttons, based on a selected group of parameters including preferred button size, minimum button size, preferred button spacing, minimum button spacing, order of buttons, height and width dimensions of the car floor button screen that is to be displayed on the car operating panel, and margins of the car floor button screen, said instructions for generating of the car floor button screen comprising instructions for:

determining, based on a number of buttons to be simultaneously displayed, a number of rows and columns in which to arrange the plurality of buttons, calculating size of the buttons based on the height and width dimensions of the car floor button screen, a default margin around the edge of the car floor button screen, the determined number of rows and columns in which the buttons are to be arranged in the car floor button screen, and the preferred button spacing between adjacent buttons, reducing the outer margin from the default margin size to the minimum margin size, reducing the button spacing from the preferred button spacing to the minimum button spacing, and recalculating the size of the buttons, in response to a determination that the calculated button size is less than the preferred button size, in an iterative manner incrementally increasing the button spacing and subsequently recalculating the button size after each such incremental increase, in response to a re-determination that the recalculated size of the buttons is larger than the preferred button size, until a re-determination shows the subsequent recalculated size of the buttons is equal to the preferred button size, generating a button layout in which the plurality of buttons are arranged into the determined number of rows and columns and sized to the subsequent recalculated button size; and instructions for generating in the configuration tool a car operating panel display including the car floor button screen, containing the buttons arranged in the determined number of rows and columns, and outputting the generated car operating panel display to the car operating panel touchscreen interface.

* * * * *